United States Patent Office 3,294,832
Patented Dec. 27, 1966

3,294,832
CATALYTIC DEHYDROGENATION OF MONONITRILES
Howard S. Young and Jefferson W. Reynolds, Kingsport, Tenn., assignors to Eastman Kodak Company, Rochester, N.Y., a corporation of New Jersey
No Drawing. Filed Aug. 27, 1965, Ser. No. 492,348
12 Claims. (Cl. 260—465.9)

This application is a continuation-in-part of our copending application Serial No. 236,702, filed November 9, 1962 (now abandoned), which in turn is a continuation-in-part of our application Serial No. 153,674 (now abandoned), filed November 20, 1961.

This invention relates to the catalytic dehydrogenation of saturated mononitriles and to novel catalysts therefor. More particularly the invention relates to a catalytic vapor phase process for the dehydrogenation of an α-monocyanoalkane, wherein the alpha and beta carbon atoms each have at least one hydrogen atom attached thereto, to the corresponding alpha, beta unsaturated mononitrile.

It is an object of our invention to provide an improved process for preparing alpha, beta unsaturated mononitriles from the aforesaid α-monocyanoalkanes.

Another object of our invention is to provide a catalytic vapor phase process for dehydrogenating an α-monocyanoalkane, wherein the alpha and beta carbon atoms each have at least one hydrogen atom attached thereto, to the corresponding alpha, beta unsaturated mononitrile.

A further object of our invention is to provide an improved process for preparing methacrylonitrile from isobutyronitrile.

Another object of our invention is to provide a catalytic vapor phase process for preparing methacrylonitrile from isobutyronitrile.

A further object of our invention is to provide novel catalysts.

Other objects will appear hereinafter.

Activated carbon and activated alumina act as catalysts in the dehydrogenation of the α-monocyanoalkanes defined hereinbefore to the corresponding alpha, beta unsaturated mononitriles in the vapor phase under the conditions set forth hereinafter. Thus, for example, methacrylonitrile can be prepared from isobutyronitrile using activated carbon or activated alumina as the catalyst for the reaction.

We have found that if the dehydrogenation process is carried out using a catalyst selected from the group consisting of activated carbon impregnated with a promoter and porous alumina having at least 50 square meters surface area per gram impregnated with a promoter, wherein said promoter is selected from the group consisting of the alkali metals sodium, lithium, potassium and cesium and the cyanides, hydroxides, nitrates and oxides of said alkali metals substantially better conversion of the α-monocyanoalkane and substantially greater yield of the corresponding alpha, beta unsaturated mononitrile are obtained than would be obtained without the use of a promoter. For purposes of clarity it is here noted that the term "α-monocyanoalkane" does not include any cyclic nitrile.

The catalysts of the present invention may be prepared by impregnating supports of activated alumina and activated carbon with solutions containing one of the alkali metals or a compound of one of the alkali metals and then drying the solvent from the supports leaving the alkali metal or compound deposited on the support. If desired the impregnated support may be heated in an oxidizing atmosphere prior to use. The catalyst is then placed in a reactor to form a catalyst bed and vapor of the α-monocyanoalkane diluted with an inert gas, is passed through the reactor in contact with the catalyst. At first the catalyst is "wild," that is, the greater portion of α-monocyanoalkane is cracked in the reactor to produce a number of compounds. After about 2 hours of use, the catalyst "tames" and the reaction becomes substantially a dehydrogenation of α-monocyanoalkane to produce the corresponding alpha, beta unsaturated mononitrile and hydrogen. The condensate from the reactor effluent is a mixture consisting almost entirely of unsaturated nitrile reaction product and α-monocyanoalkane with modest amounts of impurities.

Eventually the activity of the catalyst will decline. In preferred embodiments the catalyst can be reactivated by heating the catalyst in an oxidizing atmosphere. This can be accomplished conveniently by passing heated air through the catalyst bed in the reactor after the feed of α-monocyanoalkane has been stopped. A cyclic process consisting of alternate reaction and reactivation cycles can be carried out, or a moving-bed process may be employed in a continuous process in which the spent catalyst is continuously removed from the reactor as fresh or reactivated catalyst is added.

The α-monocyanoalkane employed in the process of the invention must contain at least 3 carbon atoms. Propionitrile, n-butyronitrile, isobutyronitrile, valeronitrile, isovaleronitrile, amylcyanide (capronitrile), isoamylcyanide, hexylcyanide, isohexylcyanide, heptylcyanide, and octylcyanide, for example, are illustrative but not limitative, of the α-monocyanoalkanes that can be employed in the process of the invention. The invention is particularly directed to the preparation of methacrylonitrile from isobutyronitrile.

The alkali metals include lithium, cesium, sodium and potassium.

The following examples illustrate the invention.

EXAMPLE 1

A quantity of 220 grams of Grade A1-0104 ⅛-inch alumina, as obtained from the Harshaw Chemical Company, was placed in an evaporating dish and a solution of 31.8 grams of $NaNO_3$ in 100 ml. of water was added with rapid stirring. The mixture stood overnight. Then the water was evaporated slowly over a hot plate. The dish containing the dried catalyst was then placed in a muffle at room temperature and heated to 600° C. The temperature was held at 600° C. for 2 hours. The calculated content of $Na_2O$ in the catalyst was 5 percent by weight.

EXAMPLE 2

Sodium-impregnated catalyst prepared as in Example 1 was placed in a reactor made of stainless steel. A mixture of isobutyronitrile and nitrogen was passed through the reactor at 600° C. and 760 mm. Hg. Partial pressure of isobutyronitrile in the mixture was 50 mm. Hg that of nitrogen 710 mm. Hg, and the contact time was 1 second. (Contact time, as the term is used in this specification, is calculated by dividing the volume in ml. of catalyst in the reactor by the rate of feed of isobutyronitrile in ml. per second at reaction conditions.) After 50 hours of continuous operation, the feed was stopped and a mixture of 1 percent oxygen in nitrogen was fed through the reactor at temperatures from 550° C. to 615° C., at a contact time of 1 second (based on total volume of gas mixture fed). Reactivation proceeded in a narrow zone about 1 inch long that traveled from the upstream end through the reactor. The reactivation cycle was continued until this narrow zone had traveled the length of the catalyst bed. After this cycle was completed, the isobutyronitrile feed was resumed under the same conditions as before. The process of alternate reaction and reactivation cycles was continued. At the end of 403 hours of reaction time, the catalyst was transferred to a glass reactor to enable observation of conditions in the reactor. The process was resumed and continued as before. At the end of 501 hours of reaction time, the partial pressure of isobutyronitrile in the feed mixture was increased to 144 mm. Hg, and the contact time was increased to 2.4 seconds. These conditions prevailed until the end of the test after 694 hours' reaction time. For the entire period, a conversion of 26 percent, a yield of 79 percent and an average productivity of 58 grams methacrylonitrile per liter of catalyst per hour was obtained.

EXAMPLES 3–8

Catalysts were prepared by the method of Example 1 but using, instead of an aqueous solution of $NaNO_3$, aqueous solutions of lithium nitrate, lithium hydroxide, sodium hydroxide, potassium hydroxide, potassium nitrate, and cesium nitrate, each in an amount sufficient to make the calculated content of the corresponding metal oxide in each finished catalyst the percentage shown under Catalyst Composition in Table I. Each catalyst was tested as in the first reaction cycle of Example 2 using as feed a mixture of nitrogen and isobutyronitrile at atmospheric pressure, in which the partial pressure of isobutyronitrile was as shown for example in Table I. In some examples the concentration of isobutyronitrile in the feed was varied for successive cuts as indicated by changes in partial pressure of isobutyronitrile given in Table I for each cut. For some cuts the contact time was varied as indicated. Conversion and yield for each cut are shown in Table I. These catalysts were not tested further after the first reaction cycle.

EXAMPLE 9

A catalyst was prepared by saturating 4 x 6 mesh granules of activated carbon with an aqueous solution containing lithium hydroxide in an amount sufficient to make a dry catalyst containing 5 percent by weight of lithium hydroxide. Water was evaporated from the saturated catalyst, and the dry LiOH containing catalyst was charged to a reactor and tested as in the first reaction cycle of Example 2. Reaction conditions and test results are shown in Table I. The catalyst was not reactivated.

EXAMPLE 10

A catalyst containing lithium metal was prepared by drying Harshaw A1–0104 ⅛-inch activated alumina pellets at 600° C. and then saturating the dry pellets with a solution of lithium metal in liquid ammonia sufficient to leave a residue of lithium amounting to 2 percent of the catalyst weight. The ammonia was evaporated in a system free of air and moisture, then the lithium-impregnated catalyst was transferred to a reactor while keeping the particles covered with nitrogen. Before testing the catalyst bed was flushed with nitrogen. Then a nitrogen-isobutyronitrile mixture was fed at 600° C. and at atmospheric pressure. Partial pressure of isobutyronitrile in the feed was 50 mm. Hg. Reaction conditions and the results are shown in Table I. The catalyst was not reactivated.

EXAMPLE 11

By the method described in Example 10, a catalyst was prepared using, instead of the lithium solution, a solution of sodium cyanide in liquid ammonia sufficient to leave a residue of sodium cyanide amounting to 5 percent by weight of the finished catalyst. This catalyst was charged to a reactor and tested as in Example 10. The catalyst was not reactivated. Reaction conditions and results are shown in Table I.

EXAMPLES 12 AND 13

Control samples of the activated carbon and activated alumina supports used in the above examples were tested in the same reactor under similar conditions. Reaction conditions and results are shown in Table I.

EXAMPLE 14

A 100 ml. portion of a sodium-impregnated alumina catalyst prepared as in Example 1 was placed in a reactor made of Vycor brand glass. A mixture of n-butyronitrile and nitrogen was passed through the reactor at 600° C. and 760 mm. Hg total pressure. The partial pressure of butyronitrile was 50 mm. Hg and the contact time was 1 second. The test lasted 14.9 hours. Crotononitrile of both cis and trans configurations was produced in nearly equal amounts. During the experiment, a total of 5.00 g. moles butyronitrile was fed. The product contained 1.05 g. moles crotononitrile and 2.60 g. moles unconverted butyronitrile. The over-all conversion and yield were 21% and 43.8%, respectively.

EXAMPLE 15

In the manner of Example 14, a mixture of propionitrile and nitrogen was passed through a reactor containing 100 ml. of sodium-impregnated alumina catalyst prepared as in Example 1. The catalyst temperature was 600° C. and the total pressure was 760 mm. Hg.

The partial pressure of propionitrile was 50 mm. Hg and the contact time was 1.0 second. During a period of 3.83 hours, 1.227 g. moles of propionitrile was fed to the reactor. Acrylonitrile was produced to the extent of 0.1216 g. mole. In addition, 1.045 g. moles of unconverted propionitrile was recovered. The conversion to acrylonitrile was 9.9% and the yield was 66.8%.

EXAMPLE 16

The catalyst of Example 15 was used without regeneration for the dehydrogenation of isovaleronitrile. The reaction conditions were the same as those of Example 15. During a period of 91 minutes, a quantity of 0.481 g. mole of isovaleronitrile was fed to the reactor along with 7.12 g. moles of nitrogen. The liquid reaction product contained 0.0552 g. mole of $\beta,\beta$-dimethylacrylonitrile and 0.307 g. mole of unconverted isovaleronitrile. Thus, 11.5% of the isovaleronitrile fed was converted to $\beta,\beta$-dimethylacrylonitrile and the yield was 31.7%.

The above examples illustrate the advantages, in terms of increased conversions and increased yields, that are obtained with the preferred catalysts. The support may be impregnated with the promoter material by any suitable method, though we prefer the method of saturating the support with a solution of the material and evaporating the solvent. As is best indicated by the examples in which lithium and lithium compounds were used, the active ingredient of the promoter appears to be the metal, whether present as the free metal or in a compound. During the first two hours of reaction the catalyst undergoes a change, which we do not attempt to explain, and the exact nature of the catalyst after this change is not certain. The reaction of the nitrile reactant in the reactor is a catalytic dehydrogenation and some hydrogen is present in the reactor effluent. The reaction is endothermic and temperature in the reactor is maintained by controlling the addition of heat.

The process of the invention can be carried out over a temperature in the range from about 500 to about 700° C. Partial pressure of isobutyronitrile is easily controlled by regulating its concentration in the feed mixture. Partial pressures of isobutyronitrile from 50 mm. Hg to 760 mm. Hg have been used successfully. Contact times may range from 0.1 to 20 seconds, though it is preferred to use contact times in the range from about 0.5 to 6 seconds.

Though examples of catalysts with supports of activated carbon as well as activated alumina have been shown, the alumina is the preferred support. Gamma, chi, eta, kappa or theta alumina, or alpha-monohydrate alumina or mixtures thereof may be used. The aluminas are porous and have relatively large surface areas, usually at least 50 and generally 50–450 square meters per gram. We may use "Bayer process activated alumina" which is essentially a mixture of alpha-monohydrate alumina, chi alumina and gamma alumina. We may employ what is known as "gel-type activated alumina," prepared by controlled calcination of a gelatinous form of alpha-monohydrate alumina. We may employ activated bauxite, such as the commercial material known as Porocel. We do not envision using the form of alumina known as alpha alumina, sometimes sold in the form of "tabular alumina." The surface area of alpha alumina is generally below 1 square meter per gram.

In some of the examples concentration of promoter is reported as the calculated equivalent of the metal oxide.

respectively, can be obtained from valeronitrile, amylcyanide, isoamylcyanide, hexylcyanide, isohexylcyanide, heptylcyanide and octylcyanide, respectively. The process of the invention is more particularly directed to the dehydrogenation of α-monocyanoalkane compounds containing 3 to 8 carbon atoms although it is not restricted thereto.

TABLE 1.—CATALYTIC DEHYDROGENATION OF ISOBUTYRONITRILE (IBN) TO METHACRYLONITRILE OVER ALKALI METAL MATERIAL ON ACTIVATED ALUMINA OR ACTIVATED CARBON AT 600° C.

| Example | Calculated Catalyst Composition | Promoter Starting Material | Reaction Conditions | | Cut Length, Hours | Percent Conv. | Percent Yield |
|---|---|---|---|---|---|---|---|
| | | | $P_{IBN}$ | Contact Time, Sec. | | | |
| 3 | 5% Li₂O on activated alumina | LiNO₃ | 50 | 1 | 2 | 9.3 | 11.1 |
| | | | 50 | 1 | 3 | 35.2 | 61.5 |
| | | | 50 | 1 | 3 | 34.5 | 72.5 |
| | | | 50 | 1 | 8 | 27.8 | 77.2 |
| | | | 100 | 1 | 2 | 21.2 | 75.2 |
| | | | 760 | 7.6 | 2 | 27.9 | 62.6 |
| 4 | 5% Li₂O on activated alumina | LiOH | 50 | 1 | 2 | 2.4 | 2.7 |
| | | | 50 | 1 | 3 | 16.2 | 23.2 |
| | | | 50 | 1 | 3 | 26.6 | 46.8 |
| | | | 50 | 1 | 8 | 24.8 | 58.1 |
| 5 | 5% Na₂O on activated alumina | NaOH | 50 | 1 | 2 | 6.7 | 8.2 |
| | | | 50 | 1 | 3 | 34.4 | 61.1 |
| | | | 50 | 1 | 3 | 32.6 | 73.3 |
| | | | 50 | 1 | 8 | 27.9 | 73.2 |
| 6 | 5% K₂O on activated alumina | KNO₃ | 50 | 1 | 2 | 3.1 | 3.9 |
| | | | 50 | 1 | 3 | 27.4 | 40.2 |
| | | | 50 | 1 | 3 | 33.1 | 53.3 |
| | | | 50 | 1 | 8 | 29.9 | 63.9 |
| 7 | 5% K₂O on activated alumina | KOH | 50 | 1 | 2 | 2.9 | 3.5 |
| | | | 50 | 1 | 3 | 25.8 | 38.0 |
| | | | 50 | 1 | 3 | 33.8 | 52.4 |
| | | | 50 | 1 | 8 | 33.2 | 66.6 |
| 8 | 5% Cs₂O on activated alumina | CsNO₃ | 50 | 1 | 2 | 2.6 | 3.5 |
| | | | 50 | 1 | 3 | 8.6 | 10.9 |
| | | | 50 | 1 | 3 | 23.8 | 37.5 |
| | | | 50 | 1 | 8 | 32.9 | 65.9 |
| 9 | 5% LiOH on activated carbon | LiOH | 50 | 1 | 2 | 20.2 | 24.3 |
| | | | 50 | 1 | 6 | 29.4 | 47.9 |
| | | | 50 | 1 | 8 | 25.7 | 59.8 |
| 10 | 2% Li metal on activated alumina | Li metal | 50 | 1 | 2 | 6.8 | 7.7 |
| | | | 50 | 1 | 3 | 23.1 | 34.4 |
| | | | 50 | 1 | 3 | 28.3 | 50.9 |
| | | | 50 | 1 | 8 | 28.2 | 61.3 |
| 11 | 5% NaCN on activated alumina | NaCN | 50 | 1 | 2 | 11.0 | 14.4 |
| | | | 50 | 1 | 3 | 39.1 | 68.7 |
| | | | 50 | 1 | 3 | 41.9 | 78.3 |
| | | | 50 | 1 | 8 | 40.3 | 80.7 |
| 12 | Activated alumina | | 50 | 1 | 2 | 1.6 | 1.8 |
| | | | 50 | 1 | 3 | 8.3 | 10.8 |
| | | | 50 | 1 | 3 | 16.5 | 25.5 |
| | | | 50 | 1 | 8 | 23.2 | 47.7 |
| 13 | Activated carbon | | 50 | 1 | 2 | 17.1 | 49.2 |
| | | | 50 | 1 | 2 | 16.0 | 55.3 |
| | | | 50 | 1 | 2 | 14.6 | 47.2 |
| | | | 50 | 1 | 3 | 15.0 | 49.2 |
| | | | 50 | 1 | 3 | 14.8 | 51.8 |
| | | | 50 | 1 | 3 | 15.7 | 58.9 |
| | | | 50 | 1 | 3 | 14.2 | 53.9 |

This is not to say that the promoter is actually present as the oxide, though in cases where the impregnated support is heated in the presence of air, there undoubtedly was some oxide formed. The examples indicate that the metal promoters of the invention are effective in whatever state they are present whether as free metal or in a metal compound. Concentration of the promoter in the catalyst, calculated as the oxide of the alkali metal in the promoter, may range from 0.1 percent to 20 percent of the weight of the support. We prefer to use an amount of promoter equivalent to an amount of the oxide of the selected metal that would be equal to from about 1 to 8 percent of the weight of the catalyst support.

Each of the foregoing examples involving dehydrogenation clearly discloses that nitrogen is the only gas present in the feed, other than the nitrile compound undergoing dehydrogenation. After reactivation of the catalyst in the manner described, for example, in Example 2 a small amount of oxygen is temporarily present at the start of the dehydrogenation reaction.

Following the procedure described hereinbefore, such as in Example 2, for example, CH₃CH₂CH=CHCN,

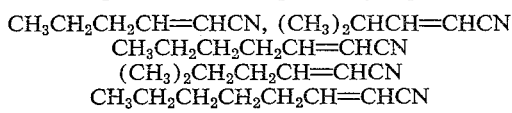

and

In preparing the catalyst, the use of extremely concentrated solutions should be avoided to assure good dispersion of metal or metal compound throughout the support.

Oxygen in small amounts (4–5 percent) may be introduced with the feed stream during the reaction cycle, but we prefer to conduct the reaction with no oxidizing agent present. The presence of oxygen may produce undesirable hot spots in the catalyst bed and will usually reduce conversion and yield. The amount of any oxygen added to the feed stream should be such that it has no significant effect on the dehydrogenation reaction.

The invention has been described with reference to certain preferred embodiments, but it will be understood that variations and modifications can be made within the scope of the invention defined in the following claims.

We claim:

1. A process which comprises contacting in the vapor phase a mixture consisting essentially of nitrogen and an alpha-monocyanoalkane containing 3 to 8 carbon atoms, wherein the alpha and beta carbon atoms each have at least one hydrogen atom attached thereto, at a temperature of from about 500° C. to about 700° C. for 0.1 second to 20 seconds with a catalyst which is activated carbon impregnated with a promoter or porous alumina having at least 50 square meters surface area per gram impregnated with a promoter, wherein said promoter is from the group consisting of the alkali metals sodium, lithium, potassium or cesium or the cyanides, hydroxides, nitrates or oxides of said alkali metals, the amount of promoter present in the catalyst being equivalent in metal content to an amount of the oxide of the metal of from 0.1 percent to 20 percent of the weight of the activated carbon or porous alumina, and recovering the corresponding alpha, beta unsaturated mono-nitrile formed.

2. A process in accordance with claim 1 wherein the contact time is about 0.5 to 6 seconds and the promoter concentration is about 1 to 8 percent.

3. A process in accordance with claim 1 wherein the catalyst is prepared by saturating the support material with a solution of the promoter, evaporating the promoter solvent and heating the promoter-impregnated support material.

4. A process in accordance with claim 1 wherein the α-monocyanoalkane is propionitrile.

5. A process in accordance with claim 1 wherein the α-monocyanoalkane is n-butyronitrile.

6. A process in accordance with claim 1 wherein the α-monocyanoalkane is isovaleronitrile.

7. A process which comprises contacting in the vapor phase a mixture consisting essentially of nitrogen and an alpha-monocyanoalkane containing 3 to 8 carbon atoms, wherein the alpha and beta carbon atoms each have at least one hydrogen atom attached thereto, at a temperature of from about 500° C. to about 700° C. for 0.1 second to 20 seconds with a porous alumina catalyst having at least 50 square meters surface area per gram impregnated with a promoter, wherein said promoter is from the group of the alkali metals sodium, lithium, potassium and cesium or the cyanides, hydroxides, nitrates or oxides of said alkali metals, the amount of promoter present in the catalyst being equivalent in metal content to an amount of the oxide of the metal of from 0.1 percent to 20 percent of the weight of the porous alumina, and recovering the corresponding alpha, beta unsaturated mono-nitrile formed.

8. A process in accordance with claim 7 wherein the contact time is about 0.5 to 6 seconds and the promoter concentration is about 1 to 8 percent.

9. A process for the production of methacrylonitrile which comprises contacting in the vapor phase a mixture consisting essentially of nitrogen and isobutyronitrile at a temperature of from about 500° C. to about 700° C. for 0.1 second to 20 seconds with a catalyst which is activated carbon impregnated with a promoter or porous alumina having at least 50 square meters surface area per gram impregnated with a promoter, wherein said promoter is from the group of the alkali metals sodium, lithium, potassium or cesium and the cyanides, hydroxides, nitrates or oxides of said alkali metals, the amount of promoter present in the catalyst being equivalent in metal content to an amount of the oxide of the metal of from 0.1 percent to 20 percent of the weight of the activated carbon or porous alumina, and recovering the methacrylonitrile formed.

10. A process in accordance with claim 9 wherein the catalyst is prepared by saturating the support material with a solution of the promoter, evaporating the promoter solvent and heating the promoter-impregnated support material.

11. A process for the production of methacrylonitrile which comprises contacting in the vapor phase a mixture consisting essentially of nitrogen and isobutyronitrile at a temperature of from about 500° C. to about 700° C. for 0.1 second to 20 seconds with a porous alumina catalyst having at least 50 square meters surface area per gram impregnated with a promoter, wherein said promoter is from the group of the alkali metals sodium, lithium, potassium or cesium and the cyanides, hydroxides, nitrates or oxides of said alkali metals, the amount of promoter present in the catalyst being equivalent in metal content to an amount of the oxide of the metal of from 0.1 percent to 20 percent of the weight of the porous alumina, and recovering the methacrylonitrile formed.

12. A process in accordance with claim 11 wherein the contact time is about 0.5 to 6 seconds and the promoter concentration is about 1 to 8 percent.

References Cited by the Examiner

UNITED STATES PATENTS

| | | | |
|---|---|---|---|
| 2,384,630 | 9/1945 | Mahan | 260—465.9 |
| 2,410,820 | 11/1946 | Harris | 260—465.9 |
| 2,671,107 | 3/1954 | Beckberger | 260—465.9 |

CHARLES B. PARKER, *Primary Examiner.*

J. P. BRUST, *Assistant Examiner.*